United States Patent
Menon et al.

(10) Patent No.: US 9,631,533 B2
(45) Date of Patent: Apr. 25, 2017

(54) METHOD AND CLEANING APPARATUS FOR REMOVAL OF SOX AND NOX FROM EXHAUST GAS

(71) Applicant: Alfa Laval Aalborg A/S, Aalborg (DK)

(72) Inventors: Mohan Menon, Porsgrunn (NO); Dag Ovrebo, Porsgrunn (NO)

(73) Assignee: Alfa Laval Aalborg A/S, Aalborg (DK)

( * ) Notice: Subject to any disclaimer, the term of this patent is extended or adjusted under 35 U.S.C. 154(b) by 0 days.

(21) Appl. No.: 14/648,723

(22) PCT Filed: Jan. 24, 2014

(86) PCT No.: PCT/EP2014/051370
§ 371 (c)(1),
(2) Date: Jun. 1, 2015

(87) PCT Pub. No.: WO2014/114735
PCT Pub. Date: Jul. 31, 2014

(65) Prior Publication Data
US 2015/0322833 A1 Nov. 12, 2015

(30) Foreign Application Priority Data
Jan. 28, 2013 (GB) .................................. 1301451.9

(51) Int. Cl.
*B01D 53/94* (2006.01)
*F01N 3/021* (2006.01)
(Continued)

(52) U.S. Cl.
CPC ............. *F01N 3/04* (2013.01); *B01D 53/508* (2013.01); *B01D 53/565* (2013.01); *B01D 53/94* (2013.01);
(Continued)

(58) Field of Classification Search
CPC B01D 53/9409; B01D 53/9427; B01D 53/94; F01N 3/021; F01N 3/023; F01N 3/103; F01N 3/106; F01N 3/2882
See application file for complete search history.

(56) References Cited

U.S. PATENT DOCUMENTS 4,481,767 A * 11/1984 Stark ................... F01N 3/0256
55/294
4,910,011 A 3/1990 Dorr
(Continued)

FOREIGN PATENT DOCUMENTS

EP 1612379 1/2006
EP 2003298 12/2008
(Continued)

OTHER PUBLICATIONS

Hartman, ET, Cool FLame Evaporation for diesel reforming technology, date unknown www.owi-aachen.de.
(Continued)

*Primary Examiner* — Timothy Vanoy
(74) *Attorney, Agent, or Firm* — Christian D. Abel

(57) ABSTRACT

A method for removal of $SO_x$ and $NO_x$ from an exhaust gas that contains $SO_x$, $NO_x$, soot and water vapor, the exhaust gas originating from a combustion of a fuel where the combustion takes place in an internal combustion engine. The exhaust gas is passed through at least one catalytic reactor having an oxidation catalyst, in which catalytic reactor at least $SO_2$ is converted to $SO_3$ and NO is converted to $NO_2$. Thereafter the exhaust gas is passed through a condenser and cooled to a temperature which is below the dew point temperature of the water in the condenser such that $SO_3$, $NO_2$ and water is condensed and $SO_3$ and $NO_2$ is dissolved into the condensed water and removed from the exhaust gas.

15 Claims, 4 Drawing Sheets

Figure 1:
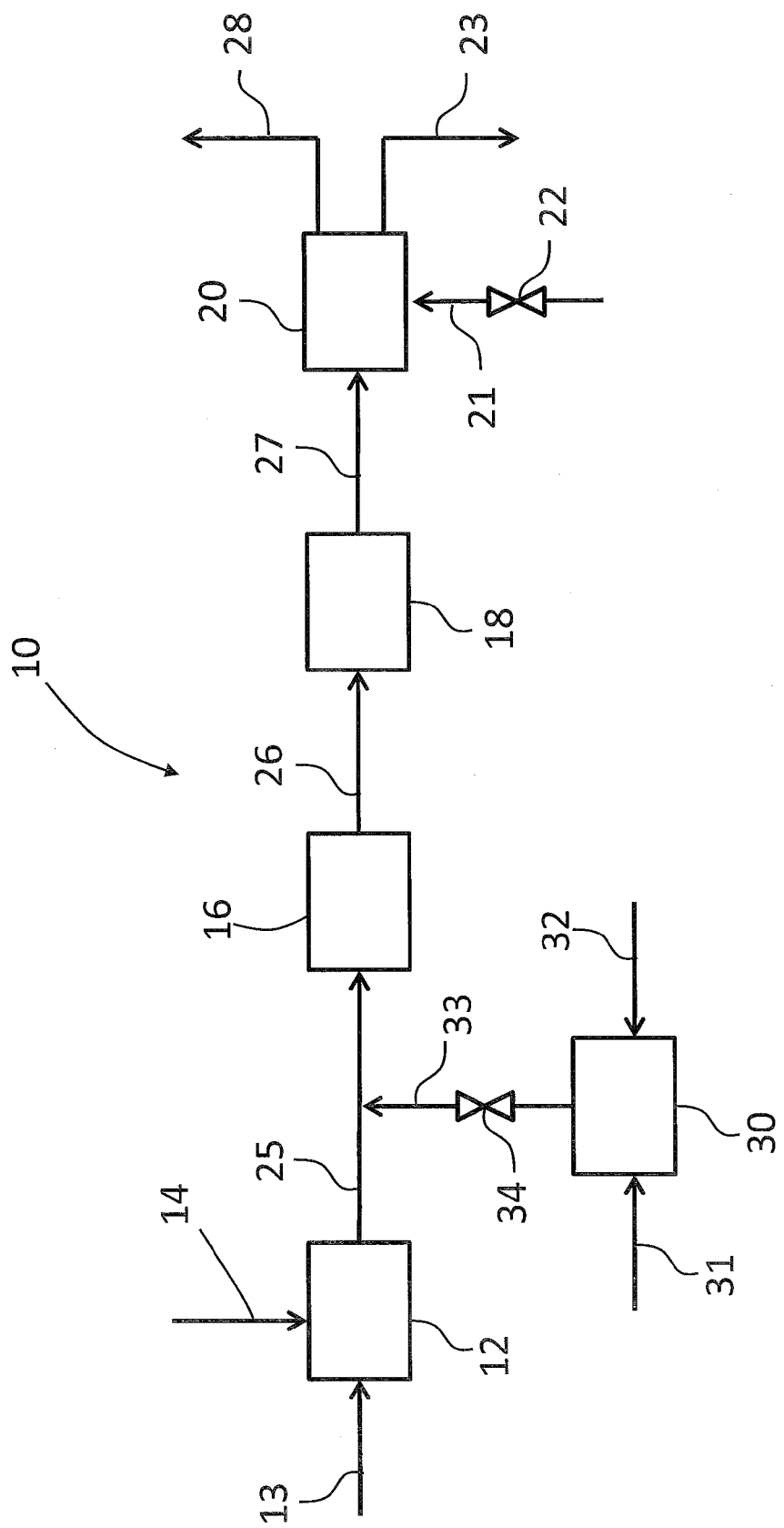

(51) Int. Cl.
  *F01N 3/023* (2006.01)
  *F01N 3/28* (2006.01)
  *F01N 3/04* (2006.01)
  *B01D 53/56* (2006.01)
  *B01D 53/50* (2006.01)
  *F01N 3/10* (2006.01)
  *F01N 3/20* (2006.01)
  *F01N 3/02* (2006.01)
  *F01N 3/025* (2006.01)

(52) U.S. Cl.
  CPC .............. *F01N 3/02* (2013.01); *F01N 3/0253* (2013.01); *F01N 3/106* (2013.01); *F01N 3/2033* (2013.01); *B01D 2255/20723* (2013.01); *F01N 2240/22* (2013.01); *F01N 2570/04* (2013.01); *F01N 2590/02* (2013.01); *Y02C 20/10* (2013.01); *Y02T 10/26* (2013.01)

(56) References Cited

U.S. PATENT DOCUMENTS

| | | | |
|---|---|---|---|
| 5,753,201 A * | 5/1998 | Lin | C01B 17/74 376/100 |
| 5,974,791 A | 11/1999 | Hirota et al. | |
| 6,092,367 A | 7/2000 | Dolling | |
| 6,092,512 A | 7/2000 | Ma | |
| 6,240,725 B1 * | 6/2001 | Scappatura | F01N 3/005 60/274 |
| 6,793,693 B1 | 9/2004 | Koehne | |
| 6,955,042 B1 | 10/2005 | Wnuck et al. | |
| 7,216,481 B2 | 5/2007 | MacBain | |
| 7,266,943 B2 * | 9/2007 | Kammel | B01D 53/9409 60/297 |
| 8,025,860 B1 * | 9/2011 | Diamond | B01D 53/002 422/168 |
| 8,061,120 B2 | 11/2011 | Hwang | |
| 2003/0226350 A1 | 12/2003 | Liu | |
| 2004/0001983 A1 | 1/2004 | Matos da Silva | |
| 2004/0163377 A1 | 8/2004 | Liu | |
| 2004/0258597 A1 * | 12/2004 | Michalakos | B01D 53/75 423/245.3 |
| 2005/0053534 A1 | 3/2005 | Liu | |
| 2005/0167173 A1 | 8/2005 | Hoetger | |
| 2005/0244764 A1 | 11/2005 | Haase | |
| 2005/0274107 A1 | 12/2005 | Liu | |
| 2006/0053780 A1 | 3/2006 | Kikuchi | |
| 2006/0059896 A1 | 3/2006 | Liu | |
| 2006/0277897 A1 | 12/2006 | Slone | |
| 2007/0261686 A1 | 11/2007 | Montel | |
| 2008/0028754 A1 | 2/2008 | Tumati | |
| 2009/0308057 A1 | 12/2009 | Fresnet | |
| 2010/0236223 A1 * | 9/2010 | Ovrebo | F01N 3/023 60/287 |
| 2010/0251700 A1 | 10/2010 | Wan | |
| 2011/0023453 A1 * | 2/2011 | Lucka | F01N 3/023 60/273 |
| 2012/0051990 A1 * | 3/2012 | Ovrebo | F01N 3/0256 423/210 |
| 2012/0231690 A1 * | 9/2012 | Pourdeyhimi | D01D 5/0985 442/329 |
| 2015/0101315 A1 * | 4/2015 | Ovrebo et al. | F01N 3/023 60/274 |

FOREIGN PATENT DOCUMENTS

| | | |
|---|---|---|
| EP | 2143478 | 1/2010 |
| GB | 2468159 | 9/2010 |
| JP | 59-101522 | 6/1984 |
| JP | 10299456 | 11/1998 |
| JP | 2000257419 | 9/2000 |
| JP | 2005273513 | 10/2005 |
| JP | 2006112313 | 4/2006 |
| JP | 2007120319 | 5/2007 |
| WO | 2006/034413 | 3/2006 |
| WO | 2007/037652 | 4/2007 |
| WO | 2009/028957 | 3/2009 |
| WO | 2014/114735 | 7/2014 |

OTHER PUBLICATIONS

Kim, ET, Formation and role of cool flames in plasma-assisted premixed combustion, 2008.

Office action from Chinese Patent Office of Aug. 22, 2012 (submitted in U.S. Appl. No. 12/675,400 inter alia as statement of relevance of foreign language references).

* cited by examiner

METHOD AND CLEANING APPARATUS FOR REMOVAL OF SOX AND NOX FROM EXHAUST GAS

The present invention relates to a method and an apparatus for cleaning the exhaust gas from an internal combustion engine.

More specifically, the present invention relates to the removal of $SO_x$, $NO_x$ and particulate matter from an exhaust gas which typically originates from an internal combustion engine on a vessel or other types of mobile units with an internal combustion engine which runs on diesel or heavy oil with a high content of sulphur.

When diesel or heavy oil with a high content of sulphur, i.e. a content of sulphur which is higher than about 100 ppm, is combusted, $SO_x$, $NO_x$ and soot/particulate matter will form. Due to stricter restrictions on emissions from vessels, $SO_x$, $NO_x$ and particulate matter (particles and soot) will largely have to be removed from the exhaust gas before the exhaust gas is released into the air.

A well known method for removal of $SO_x$ from exhaust gas is by using a scrubber in which $SO_x$ is removed by using water. The problem with scrubbers is that they are large structures, and use a substantial amount of power. The end product when removing $SO_x$ with water is a sludge, which is a hazardous waste product that must be stored and deposited for further treatment. Because scrubbers are large structures, they also require a lot of space and substantial rebuilding if it is to be retrofitted on a vessel or other types of mobile units.

In AU 2007219270 there is disclosed a method for production of highly concentrated and pure sulphuric acid wherein a sulphur source is combusted in a combustion chamber, $SO_2$ in the effluent is catalytically oxidized to $SO_3$ and the $SO_3$ is hydrated with water to sulphuric acid. The sulphuric acid is then condensed in order to separate the sulphuric acid from the effluent. The separation of the sulphuric acid is done by cooling the gas containing $SO_3$ to just below the acid dew point for sulphuric acid. Sulphuric acid is deposited on the surface of the pipes inside the condenser and is collected and cooled. Typical temperatures in this process are as follows:

The temperature of exhaust gases leaving the condenser is above 100° C., and the temperature of the sulphuric acid produced is just below the acid dew point (at least 125° C. and usually higher, depending on the sulphur content). Handling and cooling of sulphuric acid which is concentrated and hot, as in this process, requires special equipment. In addition, this process requires a substantial amount of energy and the installation itself is space-requiring.

As space and energy is of great importance in mobile use of IC-engines the method disclosed in the Australian publication is therefore presently not used in the maritime industry. In addition, handling of the corrosive condensate would be a problem on vessels and other mobile uses of IC-engines.

The objective of the present invention is thus to provide a process and an apparatus for removal of $SO_2$, $NO_x$ and particles and soot from an exhaust gas from an internal combustion engine which will remedy the problems mentioned above.

It is further an object of the present invention to obtain a process and an apparatus for removal of $SO_2$, $NO_x$ and particles and soot from an exhaust gas from an internal combustion engine where the process is more energy efficient than known processes.

It is further an object of the present invention to obtain a process and an apparatus for removal of $SO_2$, $NO_x$ and particles and soot from an exhaust gas from an internal combustion engine where the final products of the process can be stored on the vessel/vehicle and which has at least some value on the market.

It is further an object of the present invention to provide an apparatus for removal of $SO_2$, $NO_x$ and particles and soot from an exhaust gas from an internal combustion engine which is compact and is easy to retrofit on existing vessels and vehicles.

A further objective is to provide a process and an apparatus that avoids the formation of sludge.

These objectives are achieved with the claimed method as defined in claim 1 and the claimed cleaning apparatus as defined in claim 9, as well as the independent claims 16, 17 and 18. Further embodiments of the claimed invention are defined in the dependent claims.

The claimed invention is able to remove particles, soot and sulphur and to reduce $NO_x$ from emissions of internal combustion engines (IC-engines). In the process particles may be removed, $SO_2$ is oxidized to $SO_3$ and NO is oxidized to $NO_2$ in a catalytic reactor. $SO_3$ and $NO_2$ react with water to form sulphuric acid and nitric acid, respectively. Thereafter sulphuric acid and nitric acid is condensed out of the exhaust gas at a condenser by cooling the exhaust gas below the dew point of the water in the exhaust gas. Thus both sulphur and NOx are removed using water available in the exhaust in one step. A further advantage is that formation of acid mist is avoided by cooling below the dew point of the water in the exhaust gas.

In the claimed invention, typical temperatures are as follows:

Temperature of exhaust gas leaving the condenser will be below the dew point (the dew point temperature of the exhaust depends on the quality of the fuel and the load on the engine, but is always below 70° C.) of the water in the exhaust gas, preferably in the range 20° C.-70° C., more preferably in the range 20°-50° C. The temperature of the condensed acid will always be lower than 70° C. The condensate is a mixture of sulphuric acid and nitric acid.

Due to the low operating temperatures, the apparatus for carrying out the process does not take much space and requires much less energy during operation as compared to the known processes described above.

The purity of the condensate is not of any big importance for the claimed invention. The main aim is to remove sulphur and other pollutants from the exhaust gas and to obtain a waste product that has some market value instead of having to be treated as hazardous matter which must be disposed (as for scrubber sludge). Such disposal of hazardous matter has a cost associated with it. The mixture of sulphuric acid and nitric acid mentioned above will still have some market value.

The claimed invention also comprises one or more particle filters for removal of particles and soot from the exhaust gas coming from an IC-engine. The particle filter or filters are placed before the catalytic reactor such that contamination of the catalyst is avoided.

In one aspect the present invention provides a cleaning apparatus wherein one or more particle filters for removal of particles and soot from the exhaust gas coming from an IC-engine are placed upstream a condenser and or scrubber such that contamination of the liquid within the condenser and or scrubber with particulate matter is avoided.

After being used for some time, the particle filter or filters will get blocked and will need to be regenerated. This is usually done by increasing the temperature of the exhaust gas to above 800° C. under oxidizing conditions and thereby burning away the carbon deposits.

The claimed invention, however, regenerates the particle filter or filters by using cold flame gas also called cool flame gas which is passed through the particle filters when they need to be regenerated. The cold flame gas may also be used to heat the catalyst of the catalytic reactor before the catalyst reaches its operating temperature. Cold flame gas is produced in a cold flame generator in which a cold flame is maintained. In a cold flame the fuel is partially oxidized in preheated air. The temperature is kept constant below 550° C., and it is independent of air/fuel ratio and residence time. In the cold flame process, only a fraction of the calorific value of the fuel is released, often less than 50%, more often less than 40%, even more often 2-30% or even 2-20%. This heat is used to evaporate the remaining fuel, giving a homogenous gaseous fuel comprising the products of the partial oxidation and the remaining, evaporated fuel. Details and complete description of how to produce the cold flame gas can be found in the U.S. Pat. No. 6,793,693. Method for regeneration of particle filter or filters by using cold flame gas can be found in the applicant's patent, EP 2,198,133 B.

The term "cold flame" as used herein specifically refers to the cool flame phenomenon as described in the paragraph above. This phenomenon is well known to a person skilled in the art, and the name given to it refers to the relative low temperature of this specific flame compared to traditional flames and auto ignition temperatures of fuels. The cold flame can only be obtained and these low temperatures, at high temperatures the fuels will auto ignite and a normal combustion of the fuel will take place.

The "cold flame gas" comprises vaporised fuel, partially oxidized fuel including free radicals and unreacted oxygen or air. Accordingly the "cold flame gas" is a gas from a partial oxidation process which is not controlled or limited by either the full combustion of the fuel or the full combustion of the oxygen, as both unreacted oxygen and unreacted vaporised fuel form part of the cold flame gas.

The claimed invention provides a method and an apparatus that is able to remove sulphur and NOx from the exhaust gas. Furthermore, in an embodiment, the claimed invention can remove all three pollutants, particulate matter, sulphur and $NO_x$ from the exhaust gas. Since the purity of the sulphuric acid is not important, the condenser does not need to be operated at high temperatures. Because of this, less energy and less space, and no special equipment for handling hot and concentrated sulphuric acid, is needed. Furthermore, with the claimed method and apparatus exhaust gas from an IC-engine using fuel with high content of sulphur is cleaned without producing any waste that needs disposal.

Thus, there is disclosed a method for removal of SOx and NOx from an exhaust gas comprising $SO_x$, $NO_x$, soot and water, the exhaust gas originating from a combustion of a fuel where the combustion takes place in an internal combustion engine. The exhaust gas is passed through at least one catalytic reactor comprising an oxidation catalyst, in which catalytic reactor at least $SO_2$ is converted to $SO_3$ and NO is converted to $NO_2$. Thereafter the exhaust gas is passed through a condenser and cooled to a temperature which is below the dew point temperature of the water in the condenser such that $SO_3$, $NO_2$ and water is condensed and $SO_3$ and $NO_2$ is dissolved into the condensed water and removed from the exhaust gas.

The exhaust gas may be passed through a particle filter for removal of particulate matter before the exhaust gas is passed through the at least one catalytic reactor.

In an embodiment of the invention, at least some exhaust gas, may be taken out downstream the catalytic reactor and upstream the condenser, and be fed back into the exhaust gas upstream the at least one particle filter. $NO_2$ in the exhaust gas will then react with particulate matter in the particle filter and form $N_2$.

In another embodiment of the invention, at least some exhaust gas, taken out downstream the catalytic reactor and upstream the condenser, may be fed back into the internal combustion engine.

In another embodiment of the invention, the particle filter may be regenerated by passing a cold flame gas through the particle filter.

In another embodiment of the invention, the catalyst in the at least one catalytic reactor may be heated during up-start of the catalytic reactor by passing a cold flame gas or hot air, preferably from the cold flame generator, through the catalytic reactor.

In another embodiment of the invention, the exhaust gas is preferably cooled down to a temperature in the range 20° C.-70° C., more preferably in the range 30° C.-50° C., in the condenser.

In another aspect the method according to the present invention additional water is injected into the condenser. This additional water may provide cooling of the exhaust gas. The additional water may also dissolve $SO_3$ and $NO_2$ from the exhaust gas.

When the additional water is brought in contact with the exhaust in the form of water droplets these water droplets can capture and wash out acid mist droplets formed in the cooled exhaust. In a further aspect of the invention the method comprises recycling at least part of the additional water and condensed water and acids retrieved from the condenser to the condenser as the additional water.

In a further aspect the additional water may be seawater. Dissolved salts present in the seawater will react with the sulphuric acid and form sulphates. The obtained condensate stream comprising condensed water, additional water and sulphates may be disposed to the sea, as sulphates are normal components of seawater and particles in the exhaust gas have been removed upstream in the particle filter.

There is also disclosed a cleaning apparatus for removal of $SO_x$ and $NO_x$ from an exhaust gas comprising $SO_x$, $NO_x$, soot and water. The exhaust gas originates from combustion of a fuel which takes place in an internal combustion engine. The cleaning apparatus comprises at least one catalytic reactor which is fluidly connected to the internal combustion engine. The catalytic reactor comprises an oxidizing catalyst which at least converts $SO_2$ to $SO_3$ and NO to $NO_2$ when the exhaust gas is passed through the catalytic reactor. The apparatus further comprises a condenser which is fluidly connected to the catalytic reactor downstream the catalytic reactor. In the condenser the exhaust gas is cooled to a temperature which is below the dew point temperature of the water in the condenser such that the $SO_3$, the $NO_2$ and the water is condensed and the $SO_3$ and the $NO_2$ is dissolved into the condensed water and removed from the exhaust gas, whereby $SO_x$ and $NO_x$ is removed from the exhaust gas.

In an embodiment of the cleaning apparatus may further comprise a particle filter for removal of particulate matter in the exhaust gas before the exhaust gas flows through the at least one catalytic reactor. The particle filter is preferably fluidly connected to the internal combustion engine and the catalytic reactor.

In another embodiment of the cleaning apparatus the cleaning apparatus may comprise a conduit for transferring at least some exhaust gas from downstream the catalytic reactor and upstream the condenser, back into the exhaust gas upstream the particle filter.

The term "conduit" as used here refers a pipeline, channel, flow path or any other means for providing fluid communication including any means for flowing.

In another embodiment of the cleaning apparatus the cleaning apparatus may comprise a conduit for transferring at least some exhaust gas from downstream the particle filter and upstream the catalytic reactor, back into the internal combustion engine in an EGR-loop.

In another embodiment of the cleaning apparatus the cleaning apparatus may further comprise a cold flame generator in which a cold flame gas is produced. The cold flame generator is preferably fluidly connected to the particle filter such that the cold flame gas can flow through the particle filter.

In another embodiment of the cleaning apparatus the cleaning apparatus may further comprise a cold flame generator in which a cold flame gas is produced, the cold flame generator being fluidly connected to the catalytic reactor such that the cold flame gas or hot air can flow through the catalytic reactor. The cold flame generator comprises a hot air inlet and a fuel inlet. The hot air and the fuel are reacted in the cold flame generator to provide cold flame gas. If no fuel is added the hot air can flow unreacted into the catalytic reactor. This feature may effectively be used to heat the catalytic reactor in a start up situation, for instance prior to starting the engine.

In another embodiment of the cleaning apparatus, the exhaust gas is preferably cooled down to a temperature in the range 20° C.-70° C., more preferably in the range 30° C.-50° C., in the condenser.

A vessel is also provided, which comprises an internal combustion engine and a cleaning apparatus as described above for removing $SO_x$, $NO_x$ and soot from an exhaust gas wherein the cleaning apparatus is fluidly connected to the internal combustion engine such that exhaust gas from the internal combustion engine can flow through the cleaning apparatus. As used here the term "vessel" refers to a transport vessel such as a boat or a ship.

The term "particulate matter" as used here refers to soot and other particles present in an exhaust gas from an internal combustion engine.

The present invention further provides a method for removal of particulate matter and $SO_x$ from an exhaust gas comprising $SO_x$, and particulate matter, the exhaust gas originating from a combustion of a fuel where the combustion takes place in an internal combustion engine, wherein the exhaust gas is passed through a particle filter for removal of particulate matter before the exhaust gas is passed through at least one catalytic reactor for removal of $SO_x$ in which catalytic reactor at least $SO_2$ is converted to $SO_3$ and where after the exhaust gas is passed through a scrubber and cooled by contact with a scrubbing liquid to a temperature such that $SO_3$ is condensed and $SO_3$ is dissolved into the scrubbing liquid, wherein the method comprises regeneration of the particle filter by the use of cold flame gas. This aspect of the present invention avoids the formation of sludge in the scrubber as particulate matter otherwise resulting in the formation of sludge is removed upstream the scrubber.

In a further aspect of this method removal of $NO_x$ is also included in that the at least one catalytic reactor comprises an oxidation catalyst, in which catalytic reactor at least $SO_2$ is converted to $SO_3$ and NO is converted to $NO_2$.

The present invention also provides a cleaning apparatus for removal of particulate matter and $SO_x$ from an exhaust gas comprising $SO_x$ and particulate matter, the exhaust gas originating from a combustion of a fuel where the combustion takes place in an internal combustion engine, the apparatus comprising at least one catalytic reactor which is fluidly connected to the internal combustion engine, the catalytic reactor comprising an oxidizing catalyst which at least converts $SO_2$ to $SO_3$ when the exhaust gas is passed through the catalytic reactor, where the apparatus comprises a particle filter for removal of particulate matter in the exhaust gas before the exhaust gas flows through the at least one catalytic reactor, the particle filter being fluidly connected to the internal combustion engine and the catalytic reactor, the apparatus further comprising a scrubber which is fluidly connected to the catalytic reactor downstream the catalytic reactor, in which scrubber the exhaust gas is cooled by contact with a scrubbing liquid to a temperature such that the $SO_3$ is condensed and the $SO_3$ is dissolved into the scrubbing liquid and thereby removed from the exhaust gas, wherein the apparatus comprises a cold flame generator in which a cold flame gas is produced, the cold flame generator being fluidly connected to the particle filter such that the cold flame gas can flow through the particle filter, such that the filter is regenerated. This aspect of the present invention avoids the formation of sludge in the scrubber as particulate matter otherwise resulting in the formation of sludge is removed in the particle filter upstream the scrubber.

In a further aspect this apparatus, may further comprise the cold flame generator being fluidly connected to the catalytic reactor such that the cold flame gas can flow through the catalytic reactor. In this aspect both the particle filter and the catalytic reactor are regenerated by the cold flame gas.

In the following, several non-limiting embodiments of the claimed invention will be described in detail, with reference to the figures, where FIG. 1 schematically illustrates a first embodiment of the present invention.

Figure 2:
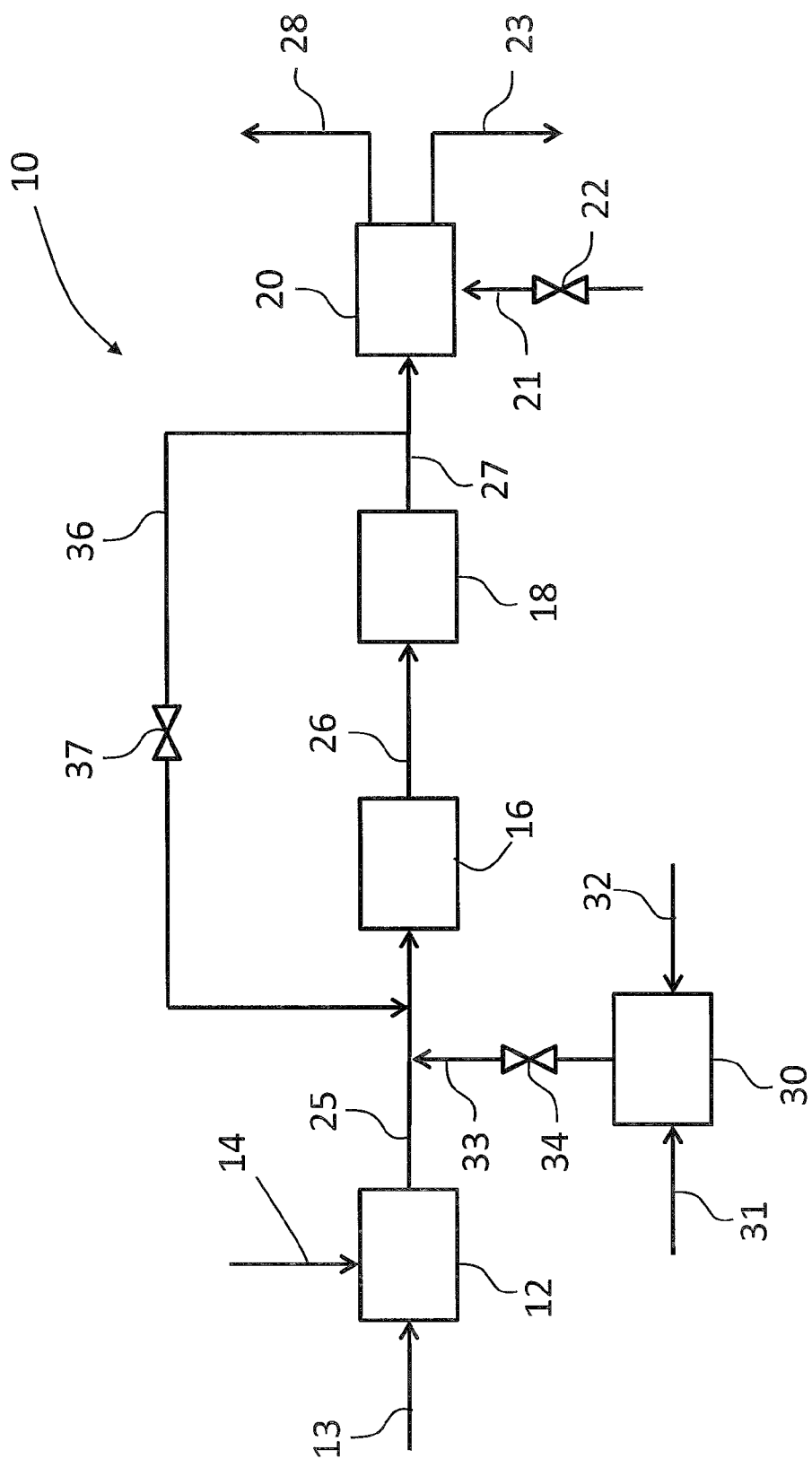

FIG. 2 schematically illustrates a second embodiment of the present invention wherein exhaust gas is returned from downstream the oxidation catalytic reactor to the exhaust gas upstream the particle filter.

Figure 3:
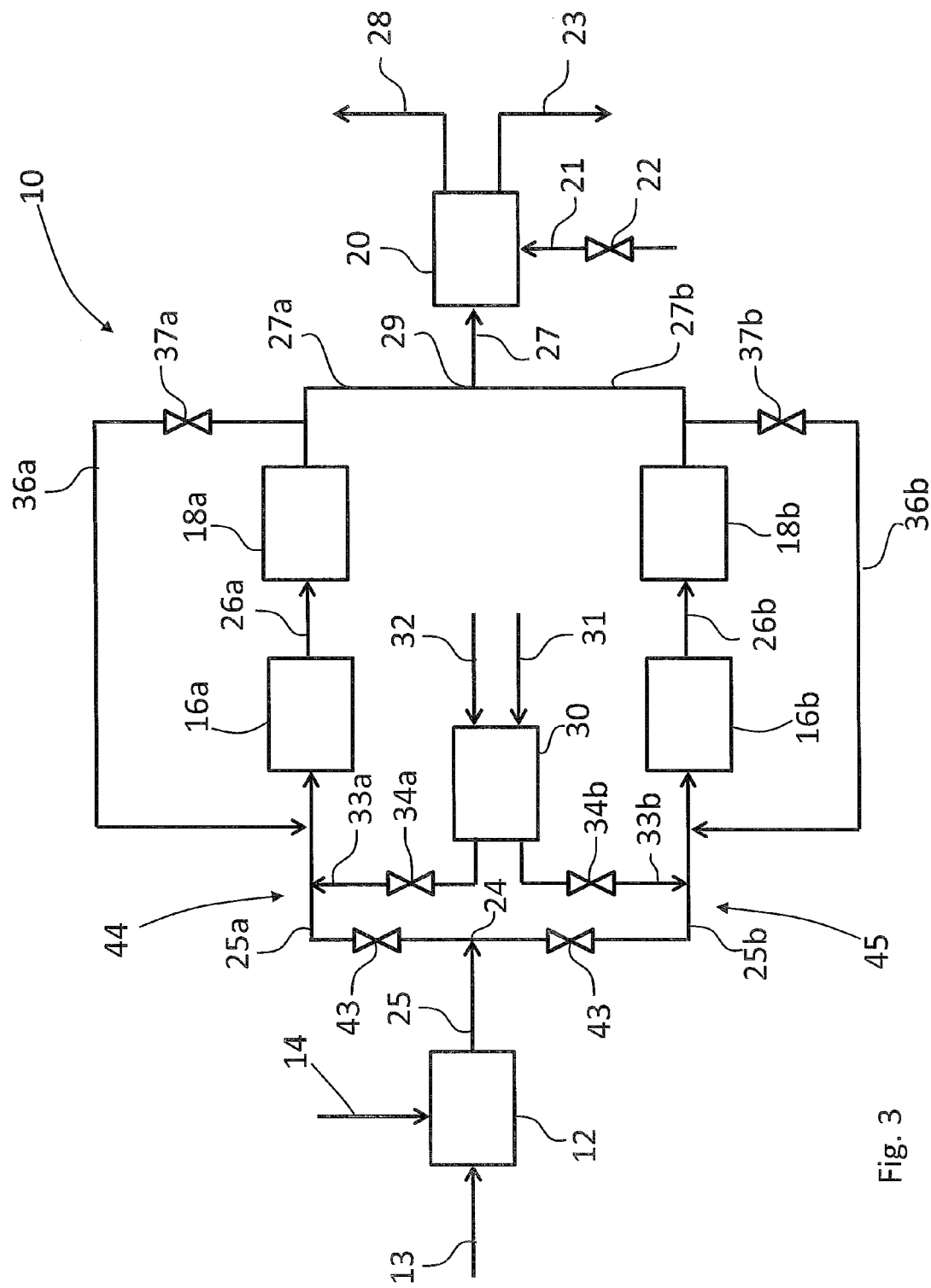

FIG. 3 schematically illustrates a third embodiment of the present invention which is similar to the embodiment in FIG. 2, but where there are two parallel flow paths.

Figure 4:
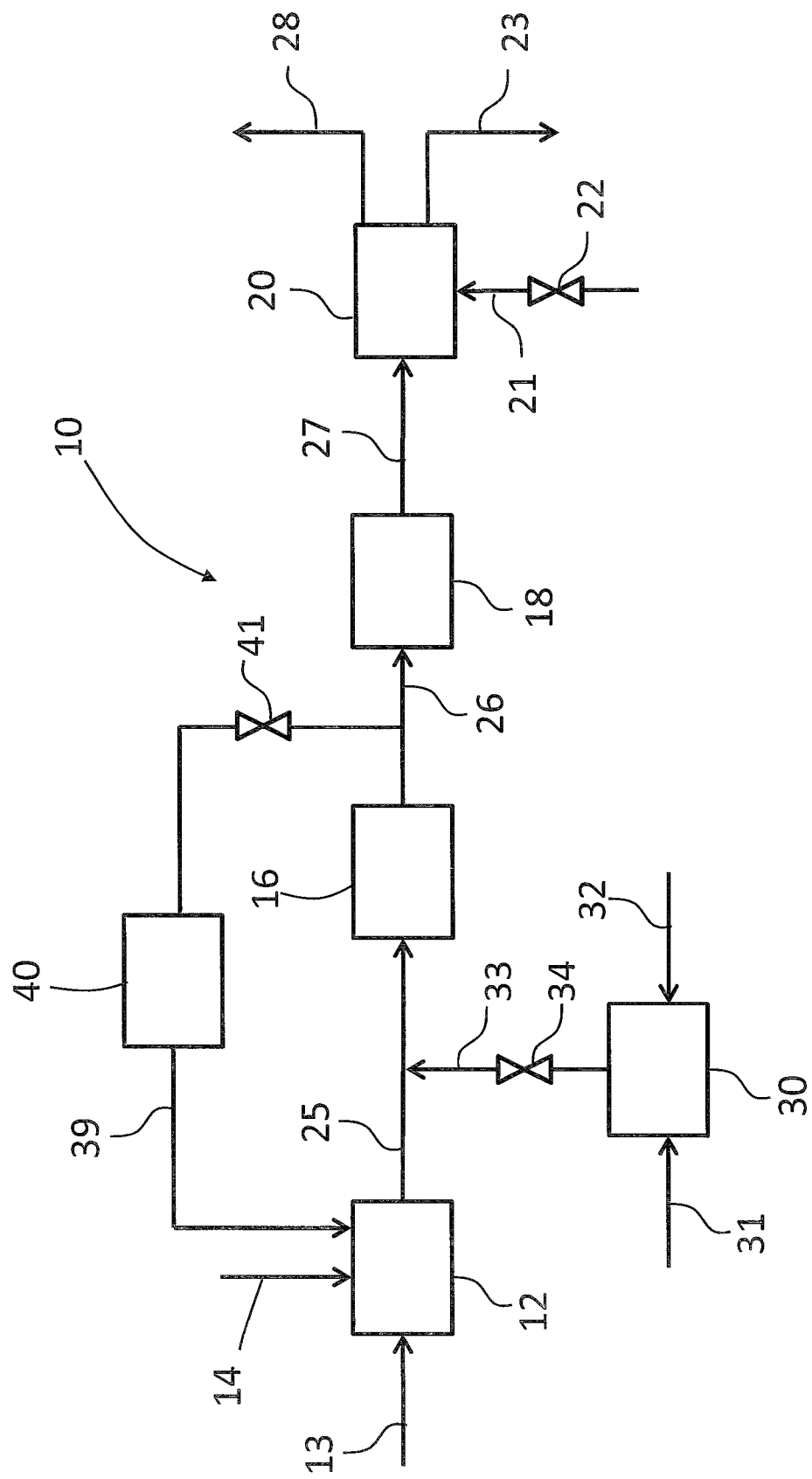

FIG. 4 schematically illustrates a fourth embodiment of the present invention wherein exhaust gas is returned from downstream the particle filter to the internal combustion engine.

In all FIGS. 1-4 the same technical features are given the same reference numbers. It should also be noted that the figures show the main parts of the present invention while other standard parts such as valve devices have not all been included. Such devices would, however, be obvious for a person skilled in the art to include in the cleaning apparatus where and when that is necessary.

In FIG. 1 there is shown a first embodiment of a cleaning apparatus 10 for removing $SO_x$, $NO_x$ and soot/particulate matter from an exhaust gas. The exhaust gas is produced in an IC-engine 12, typically an IC-engine on a vessel, but may also be an IC-engine arranged on other types of equipment such as vehicles, electrical generators driven by an IC-engine and so on.

Fuel is fed into the IC-engine 12 through a fluid flow path 13. Air is fed into the IC-engine through a fluid flow path 14. In the combustion chamber of the IC-engine (not shown in the figures) the fuel is combusted with the air and forms an exhaust gas. The fuel comprises a high content of sulphur which forms predominantly $SO_2$ during the combustion process in the IC-engine. Due to restrictions on emissions in exhaust gas, $SO_2$ must be removed from the exhaust gas, at least so much of it that the sulphur content in the exhaust gas released into the atmosphere is below the limits set by official standards and requirements. For example for marine vessel the limits for $SO_x$ and $NO_x$ in the exhaust gas is given in the IMO regulations (IMO=International Maritime Organization).

The cleaning apparatus according to the present invention is connected to the IC-engine 12 with a fluid flow path 25 which fluidly connects a particle filter 16 to the IC-engine.

Downstream the particle filter 16 a catalytic reactor 18 is arranged in fluid communication with the particle filter through a fluid flow path 26. The catalytic reactor 18 comprises at least one oxidizing catalyst such that $SO_x$, typically $SO_2$, is converted to $SO_3$ and such that $NO_x$, typically NO, is converted to $NO_2$. The oxidizing catalyst may for example be a vanadium pentoxide catalyst or another suitable catalyst. The particle filter 16 removes soot and particles which are present in the exhaust gas and which may damage or reduce the efficiency of the oxidizing catalyst in the catalytic reactor 18.

The cleaning apparatus 10 further comprises a condenser 20 which is fluidly connected to the catalytic reactor 18 downstream the catalytic reactor with a fluid flow path 27. The condenser 20 cools the exhaust gas below the dew point temperature of the water contained in the condenser 20, i.e. the exhaust gas is cooled down to a temperature in the range 20° C.-70° C., or more preferably, in the range 20° C.-50° C. The water will be part of the exhaust gas as a result of the combustion process in the IC-engine. The cleaning apparatus 10 may, however, be provided with a fluid flow path 21 connected to a source of water such that water can be injected into the condenser 20 if necessary. A valve device 22 controls the flow of water through the fluid flow path 21.

When the exhaust gas is cooled below the dew point temperature of the water, the water is condensed, the $SO_3$ in the exhaust gas is also condensed out such that sulphuric acid is formed and the $NO_2$ in the exhaust gas is condensed out such that nitric acid is formed. A fluid flow path 23 is connected to a first outlet of the condenser 20 through which the mixture of sulphuric acid, nitric acid and water leaves the condenser. A fluid flow path 28 is connected to a second outlet of the condenser 20 through which the remaining exhaust gas leaves the condenser 20.

The cleaning apparatus 10 shown in FIG. 1 is also provided with a cold flame generator 30 in which a cold flame gas is produced. Fuel is fed into the cold flame generator through a fluid flow path 31 while preheated air is fed into the cold flame generator through a fluid flow path 32. The fuel may be the same fuel that is fed into the IC-engine 10. In the cold flame generator, the fuel is partially oxidized to form a cold flame gas as explained above. A fluid flow path 33 is connected to the cold flame generator 30 and the fluid flow path 25 such that the cold flame gas produced in the cold flame generator 30 may flow from the cold flame generator 30 into the fluid flow path 25. The fluid flow path 33 is provided with a valve device 34 such that the flow of cold flame gas through the fluid flow path 33 may be controlled. The cold flame gas is used to regenerate the particle filter 16 when it has become partly or completely blocked by soot/particulate matter. To regenerate the particle filter 16 cold flame gas is transferred from the cold flame generator and through the particle filter 16. The cold flame gas will oxidize the soot and thereby regenerate the particle filter 16. The cold flame gas may also be used to heat up the oxidizing catalyst in the catalytic reactor 18 to its working temperature, which is between 300° C.-700° C., before exhaust gas from the IC-engine is passed through the catalytic reactor.

With the first embodiment of the present invention, the resulting exhaust gas, after having been past through the cleaning apparatus 10, has a very low content of sulphur and soot/particulate matter.

The embodiment of the present invention shown in FIG. 2 is very similar to the embodiment shown in FIG. 1. As mentioned above, the same technical features have the same reference numbers in all figures and will therefore not be repeated again.

The embodiment in FIG. 2 differs from the embodiment shown in FIG. 1 in that the cleaning apparatus 10 further is provided with a fluid flow line 36 which in one end is connected to the fluid flow path 27, which fluidly connects the catalytic reactor 18 and the condenser 20, and to the fluid flow path 25, which fluidly connects the particle filter 16 and the IC-engine when the cleaning apparatus is operating. The fluid flow path 36 is preferably provided with a valve device 37 such that the flow of exhaust gas through the fluid flow path 36 may be controlled. The inclusion of the fluid flow path 36 means that exhaust gas downstream the catalytic reactor 18, which comprises $NO_2$, can be returned to the exhaust gas upstream the particle filter 16. When the $NO_2$ flows through the particle filter 16 soot will react with the $NO_2$ and form $N_2$ which contributes to reducing the content of $NO_x$ in the exhaust gas and at the same time removes soot from the particle filter 16.

With the second embodiment of the present invention, the resulting exhaust gas, after having been past through the cleaning apparatus 10, has a very low content of sulphur and soot and a low content of $NO_x$.

The embodiment shown in FIG. 3 is similar to the embodiment shown in FIG. 2. The difference is that the cleaning apparatus 10 is provided with two particle filters 16a, 16b and two catalytic reactors 18a, 18b where the particle filter 16a and the catalytic reactor 18a is arranged in a first branch of two parallel fluid flow paths for the exhaust gas, while the particle filter 16b and the catalytic reactor 18b is provided in the second branch of the two parallel fluid flow paths.

The fluid flow path 25 which is fluidly connected to the 1C-engine when the cleaning apparatus 10 is operating, is divided into two branches at a first fluid flow path connection 24, a first branch 44 and a second branch 45. The two branches 44, 45 are joined together again in a second fluid flow path connection 29 as shown in FIG. 3.

The first branch 44 comprises a particle filter 16a which is fluidly connected to the fluid flow path connection 24 with a fluid flow path 25a. The particle filter 16a is fluidly connected to a catalytic reactor 18a which is arranged downstream the particle filter 16a. The catalytic reactor 18a is further fluidly connected to the second fluid flow path connection 29 which is downstream the catalytic reactor 18a, with a fluid flow path 27a. Similar to the embodiment shown in FIG. 2, there is also provided a fluid flow path 36a which is connected in one end to the fluid flow path 27a and in the other end to the fluid flow line 25a such that exhaust gas flowing in the fluid flow path 27a downstream the catalytic reactor 18a can be returned and fed into the exhaust gas flowing in the fluid flow path 25a. The fluid flow path 36a is preferably provided with a valve device 37a such that the flow of exhaust gas through the fluid flow path 36a can be controlled.

The second branch 45 comprises a particle filter 16b which is fluidly connected to the fluid flow path connection 24 with a fluid flow path 25b. The particle filter 16b is fluidly connected to a catalytic reactor 18b which is arranged downstream the particle filter 16b. The catalytic reactor 18b is further fluidly connected to the second fluid flow path connection 29 which is downstream the catalytic reactor 18b, with a fluid flow path 27b. Similar to the embodiment shown in FIG. 2, there is also provided a fluid flow path 36b which is connected in one end to the fluid flow path 27b and in the other end to the fluid flow line 25b such that exhaust gas flowing in the fluid flow path 27b downstream the catalytic reactor 18b can be returned and fed into the exhaust gas flowing in the fluid flow path 25b. The fluid flow path 36b is preferably provided with a valve device 37b such that the flow of exhaust gas through the fluid flow path 36b can be controlled.

An alternative for routing the fluid flow paths 36a, 36b is to connect one end of the fluid flow path 36a to the fluid path 27a and the other end of the fluid flow path 36a to the fluid flow path 25b such that exhaust gas can be flowed from downstream the catalytic reactor 18a to upstream the particle filter 16b. Similarly, one end of the fluid flow path 36b can be connected to the fluid path 27b while the other end of the fluid flow path 36b is connected to the fluid flow path 25a such that exhaust gas can be flowed from downstream the catalytic reactor 18b to upstream the particle filter 16a.

With the third embodiment of the present invention, the resulting exhaust gas, after having been past through the cleaning apparatus 10, has a very low content of sulphur, $NO_x$ and soot.

In FIG. 4 there is again shown an embodiment which is similar to the embodiment shown in FIGS. 1-2. The only difference between the embodiment in FIG. 4 and in FIG. 1 is that the embodiment in FIG. 4 is provided with an EGR-loop (exhaust gas return). The cleaning apparatus 10 is provided with a fluid flow path 39 which in one end is connected to the fluid flow path 26, which connects the particle filter 16 and the catalytic reactor 18, and in the other end is connected to the engine 10 when the cleaning apparatus is operating such that exhaust gas can be past from the fluid flow path 26 back to the combustion chamber in the IC-engine 10. The fluid flow path 39 may be provided with a cooler 40 such that the exhaust gas may be cooled before being returned back into the combustion chamber and a valve device 41 such that the flow of exhaust gas through the fluid flow path 39 can be controlled. When the exhaust gas is returned back into the combustion chamber, the result is that the content of $NO_x$ in the exhaust gas is lowered.

With the fourth embodiment of the present invention the resulting exhaust gas after having been past through the cleaning apparatus 10, has a very low content of sulphur and soot and a low content of $NO_x$.

The fluid flow paths 13, 14, 21, 23, 25, 26, 26a, 26b, 27, 27a, 27b, 28, 31, 32, 31, 33, 33a, 33b, 36, 36a, 36b, 39 are typically fluid lines in the form of pipes, tubes, conduits or similar devices through which a fluid can flow.

As can be seen from the description of the various embodiments of the present invention, after the exhaust gas has been passed through the cleaning apparatus 10, a substantial amount of $SO_x$, $NO_x$ and soot/particulate matter have been removed from the exhaust gas originating from the combustion process in the IC-engine 10. The content of SOx and NOx is well below the requirement in the IMO regulations, and generally the exhaust gas is very clean.

The invention claimed is:

1. A method for removal of $SO_x$ and $NO_x$ from an exhaust gas comprising $SO_x$, $NO_x$, soot and water vapour, the exhaust gas originating from a combustion of a fuel where the combustion takes place in an internal combustion engine, wherein the exhaust gas is passed through at least one catalytic reactor comprising an oxidation catalyst, in which catalytic reactor at least $SO_2$ is converted to $SO_3$ and NO is converted to $NO_2$, where after the exhaust gas is passed through a condenser and cooled to a temperature which is below the dew point temperature of the water in the condenser such that $SO_3$, $NO_2$ and water is condensed and $SO_3$ and $NO_2$ is dissolved into the condensed water and removed from the exhaust gas,
wherein water is injected into the condenser.

2. Method according to claim 1,
wherein the exhaust gas is passed through a particle filter for removal of particulate matter before the exhaust gas is passed through the at least one catalytic reactor.

3. Method according to claim 2,
wherein at least some exhaust gas, taken out downstream the catalytic reactor and upstream the condenser, is fed back into the exhaust gas upstream the at least one particle filter.

4. Method according to claim 2,
wherein at least some exhaust gas, taken out downstream the particle filter and upstream the catalytic reactor, is fed back into the internal combustion engine.

5. Method according to claim 2,
wherein the particle filter is regenerated by passing a cold flame gas through the particle filter.

6. Method according to claim 2,
wherein the catalyst in the at least one catalytic reactor is heated during up-start of the catalytic reactor by passing a cold flame gas through the catalytic reactor.

7. Method according to claim 1,
wherein exhaust gas is cooled down to a temperature in the range 20° C.-70° C.

8. Method according to claim 1,
wherein exhaust gas is cooled down to a temperature in the range 30° C.-50° C.

9. A cleaning apparatus for removal of $SO_x$ and $NO_x$ from an exhaust gas comprising $SO_x$, $NO_x$, soot and water vapor, the exhaust gas originating from a combustion of a fuel where the combustion takes place in an internal combustion engine, the apparatus comprising at least one catalytic reactor which is fluidly connected to the internal combustion engine, the catalytic reactor comprising an oxidizing catalyst which at least converts $SO_2$ to $SO_3$ and NO to $NO_2$ when the exhaust gas is passed through the catalytic reactor, the apparatus further comprising a condenser which is fluidly connected to the catalytic reactor downstream the catalytic reactor, in which condenser the exhaust gas is cooled to a temperature which is below the dew point temperature of the water in the condenser such that the $SO_3$, the $NO_2$ and the water is condensed and the $SO_3$ and the $NO_2$ is dissolved into the condensed water and removed from the exhaust gas whereby $SO_x$ and $NO_x$ is removed from the exhaust gas,
wherein the condenser is connected to a fluid flow path which is connected to a source of water such that water can be injected into the condenser.

10. A cleaning apparatus according to claim 9,
wherein the apparatus further comprising a particle filter for removal of particulate matter in the exhaust gas before the exhaust gas flows through the at least one catalytic reactor, the particle filter being fluidly connected to the internal combustion engine and the catalytic reactor.

11. A cleaning apparatus according to claim 10,
wherein the apparatus comprises a conduit for transferring at least some exhaust gas from downstream the catalytic reactor and upstream the condenser, back into the exhaust gas upstream the particle filter.

12. A cleaning apparatus according to claim 10,
wherein the apparatus comprises a conduit for transferring at least some exhaust gas from downstream the particle filter and upstream the catalytic reactor, back into the internal combustion engine in an EGR-loop.

13. A cleaning apparatus according to claim 10,
wherein the apparatus further comprises a cold flame generator in which a cold flame gas is produced, the cold flame generator being fluidly connected to the particle filter such that the cold flame gas can flow through the particle filter.

14. A cleaning apparatus according to claim 10,
wherein the apparatus further comprises a cold flame generator in which a cold flame gas is produced, the cold flame generator being fluidly connected to the catalytic reactor such that the cold flame gas can flow through the catalytic reactor.

15. A vessel comprising an internal combustion engine and a cleaning apparatus for removing $SO_x$, $NO_x$ and soot from an exhaust gas according to claim 9
wherein the cleaning apparatus is fluidly connected to the internal combustion engine such that exhaust gas from the internal combustion engine can flow through the cleaning apparatus.

* * * * *